United States Patent
Lerner

(10) Patent No.: US 7,647,187 B2
(45) Date of Patent: Jan. 12, 2010

(54) IDENTIFYING STATISTICALLY LINEAR DATA

(75) Inventor: Jeffrey Lerner, Oakland, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 629 days.

(21) Appl. No.: 11/432,856

(22) Filed: May 11, 2006

(65) Prior Publication Data

US 2006/0271308 A1    Nov. 30, 2006

Related U.S. Application Data

(60) Provisional application No. 60/681,182, filed on May 13, 2005.

(51) Int. Cl.
*G06F 19/00* (2006.01)
*C12P 19/34* (2006.01)

(52) U.S. Cl. ........................................ 702/19; 435/91.2

(58) Field of Classification Search ....................... None
See application file for complete search history.

(56) References Cited

OTHER PUBLICATIONS

Livak, Kenneth et al., "Analysis of Relative Gene Expression Data Using Real-Time Quantitative PCR and the 2-$\Delta\Delta CT$ Method," *Elsevier Science*, Methods 25, pp. 402-408 (2001).
Dheda, Keertan, et al., "Validation of housekeeping genes for normalizing RNA expression in real-time PCR," *BioTechniques*, vol. 37, pp. 112-119, (Jul. 2004).

*Primary Examiner*—John S Brusca
(74) *Attorney, Agent, or Firm*—Townsend and Townsend and Crew; David B. Raczkowski

(57) ABSTRACT

Methods, apparatus, and systems are provided for processing a data set having noise to determine whether the data set exhibits statistically linear behavior. A true data signal is calculated based on local properties of the data, and an estimate of the noise in the data is calculated from the true data signal. A measure of the estimated noise is then compared to properties of a linear fit to the data set.

23 Claims, 7 Drawing Sheets

IDENTIFYING STATISTICALLY LINEAR DATA

CROSS-REFERENCES TO RELATED APPLICATIONS

This application claims the benefit of U.S. Provisional Application No. 60/681,182, filed May 13, 2005, entitled "SYSTEMS AND METHODS FOR IDENTIFYING STATISTICALLY FLAT DATA IN A DATA SET," which is related to, and concurrently filed with U.S. Provisional Application Ser. No. 60/680,765 entitled DETERMINATION OF BASELINE END CYCLE IN REAL TIME PCR USING DERIVATIVE PEAK ANALYSIS, the disclosures of which are incorporated herein by reference in their entirety. The present application is also related to the following commonly-assigned concurrently filed U.S. patent application Ser. No. 11/433,183, entitled "BASELINING AMPLIFICATION DATA." The respective disclosures of these applications are incorporated herein by reference for all purposes.

BACKGROUND OF THE INVENTION

The present invention relates generally to data processing systems and methods, and more particularly to systems and methods for identifying statistically linear data in a data set of an amplification process, such as polymerase chain reaction (PCR).

Many experimental processes exhibit amplification of a quantity. For example, in PCR, the quantity may correspond to the number of parts of a DNA strand that have been replicated, which dramatically increases during an amplification stage or region. Other experimental processes exhibiting amplification include bacterial growth processes. The quantity is detected from an experimental device via a data signal, whose data points are analyzed to determine information about the amplification. As part of the data analysis, it is important to know if amplification has potentially occurred; otherwise, effort might be wasted on analyzing non-amplifying data. If the data is statistically linear, then amplification has not occurred.

Ideally, the data from the amplification detection device would be a monotonic and continuous signal, thus one could easily identify whether the data, or portions thereof, has statistically linear behavior. However, the signal from the amplification device typically contains noise, thus making identifying a behavior of the signal difficult. The noise manifests itself in each data point in the signal from the device having random fluctuations that occur on top of the true signal, e.g. the actual number of DNA strands. Thus, the data requires processing to allow for identifying of linear behavior.

A typical prior method for processing data to determine if it is statistically linear is with a linear least squares (LSQ) fit. The correlation value of the LSQ fit can be used to determine whether there is an adequate fit. By standard convention, a correlation value of 0 is related to a bad fit, thus the data is not linear, and a value of 1 suggests a good fit for linearity. The problem is that in the presence of noise, the correlation value can be close to 0 or 1 for data that looks statistically linear. Additionally, the correlation value does not correspond to a physical value that may provide additional insight and efficacy. Thus, the correlation value is not an acceptable criterion, particularly for data that can be extremely noisy.

Therefore it is desirable to provide systems and methods for processing a data set having noise, and for identifying whether the dataset is statistically linear, that overcome the above and other problems.

BRIEF SUMMARY OF THE INVENTION

Accordingly, embodiments of the present invention provide methods and systems directed to processing data to determine whether the data exhibits statistically linear behavior. Statistically linear data means that the data generally does not curve downward or upward or otherwise display amplification. Such data typically appears to be roughly linear with a large noise signal superposed upon it. The data may be received from real-time PCR processes or other processes exhibiting amplification or growth.

According to one exemplary embodiment of the present invention, a method of processing data is provided. The method typically includes receiving an original set of data points having a signal component and a noise component. The original data set is fit to a linear function. In one aspect, the fit is accomplished by calculating a linear least squares fit to the data set. The method also includes calculating a residual between the original data set and the linear fit, and calculating a measure of the residual between the original data set and the linear fit. In one aspect, the measure is a standard deviation.

The method also typically includes estimating the noise component present in the data set by calculating a smoothed data set and calculating the residual between the smoothed data set and the original data set. A smoothed data point is based on values of original data points that are local to that smoothed data point. In one aspect, a low pass filter is used to calculate the smoothed data set. Exemplary low pass filters include a Savitzy-Golay filter, a digital filter, or digital smoothing polynomial filter. In another aspect, a value of a smoothed data point is an average of original data points within a window around the smoothed data point.

The method also typically includes calculating a measure of the residual of the estimated noise, and comparing the measures to determine whether the original data set exhibits statistically linear behavior. The comparing may include calculating a ratio of the first and second measure to determine if the ratio is smaller or greater than a pre defined value. In one aspect, the pre-defined value is of order 1.

In preferred aspects, the method is implemented in a processor, such as a processor in a stand-alone computer, a network attached computer or a data acquisition device such as a real-time PCR machine. One example of a real-time PCR machine is the iCycler iQ System provided by Bio-Rad Laboratories.

According to another exemplary embodiment of the present invention, an information storage medium having a plurality of instructions adapted to direct an information processing device to perform an operation of processing data to determine whether the curve exhibits linear behavior is provided. In one aspect, the information storage medium is a RAM or ROM unit, hard drive, CD, DVD or other portable medium.

According to another exemplary embodiment of the present invention, a PCR detection system is provided. The PCR detection system includes a detector for producing an original set of data points having a signal component and a noise component and includes logic for processing data to determine whether the data exhibits linear behavior.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

The present invention provides techniques for processing a data set and identifying whether the data set is statistically linear, as well as distinguishing such a linear data set from a data set containing an amplification signal. In preferred aspects, the present invention is particularly useful for processing data from PCR growth or amplification processes to identify and remove statistically linear data prior to further analysis of the data. It should be appreciated, however, that the teachings of the present invention are applicable to processing any data set or curve that may include noise, and particularly curves that should otherwise exhibit growth or amplification such as a bacterial growth process.

Figure 1:
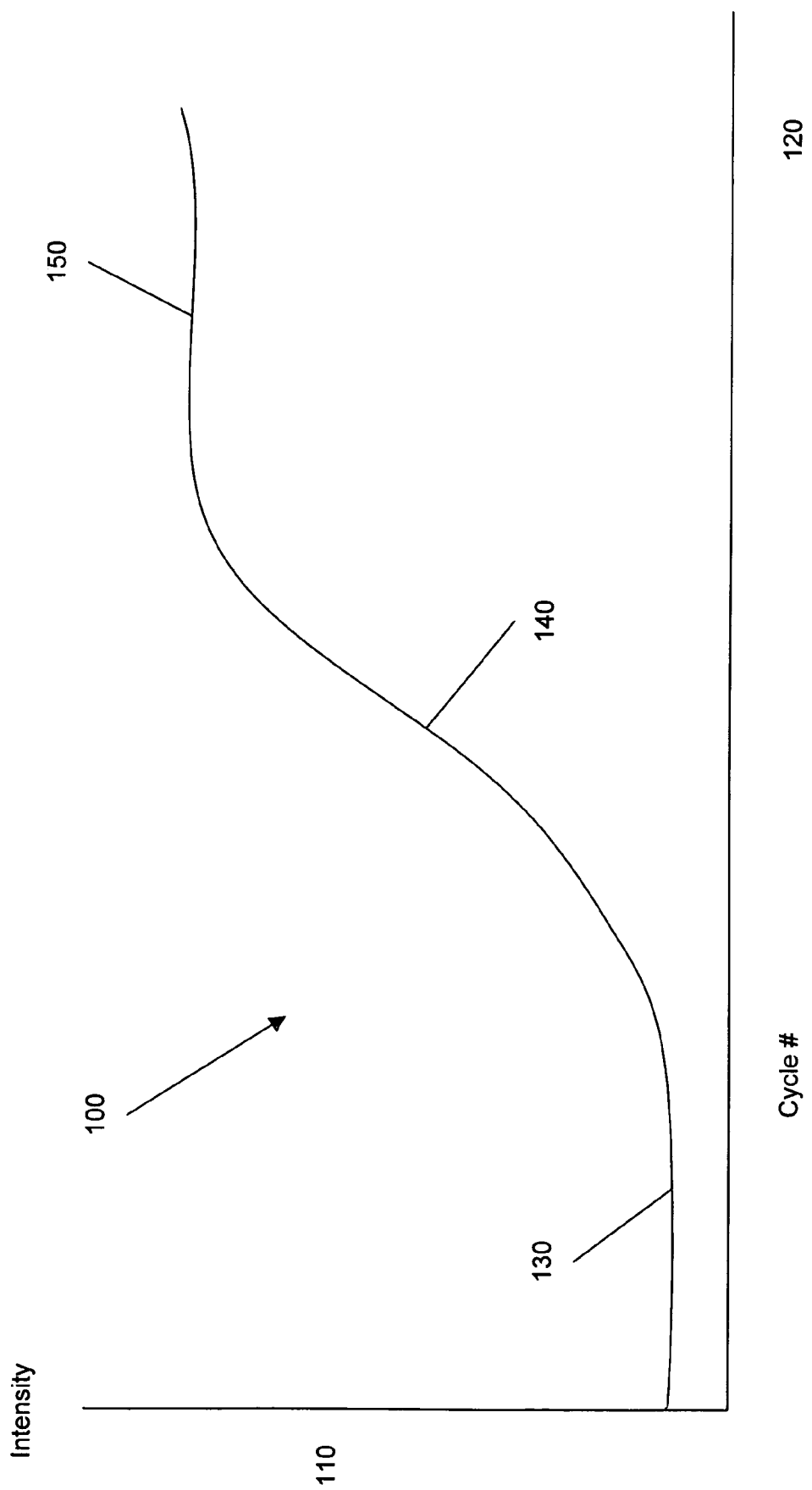
FIG. 1 illustrates an example of a PCR amplification curve.

FIG. 1 shows an example of a PCR curve 100, where intensity values 110 vs. cycle number 120 are plotted for a typical PCR process. The values 110 may be any physical quantity of interest, and the cycle number may be any unit associated with time or number of steps in the process. Such amplification curves typically have a linear region 130 followed by an amplification region 140 and then by an asymptotic region 150, as shown in FIG. 1. There also might be additional types of behavior such as downward curving data. An amplification region may have exponential, sigmoidal, high order polynomial, or other type of logistic function or logistic curve that models growth.

To understand the experimental process involved, it is important to identify the position and shape of amplification region 140. For example, in a PCR process, it may be desirable to identify the onset of amplification, which occurs at the end of the baseline region (linear region 130). A step in identifying the location is to identify if a possible amplification region even exists, as a PCR process may not show any amplification. However, since real-time PCR data has noise, the identification of whether the data set might exhibit amplification, or equivalently that it is not statistically linear, can be difficult.

Figure 2:
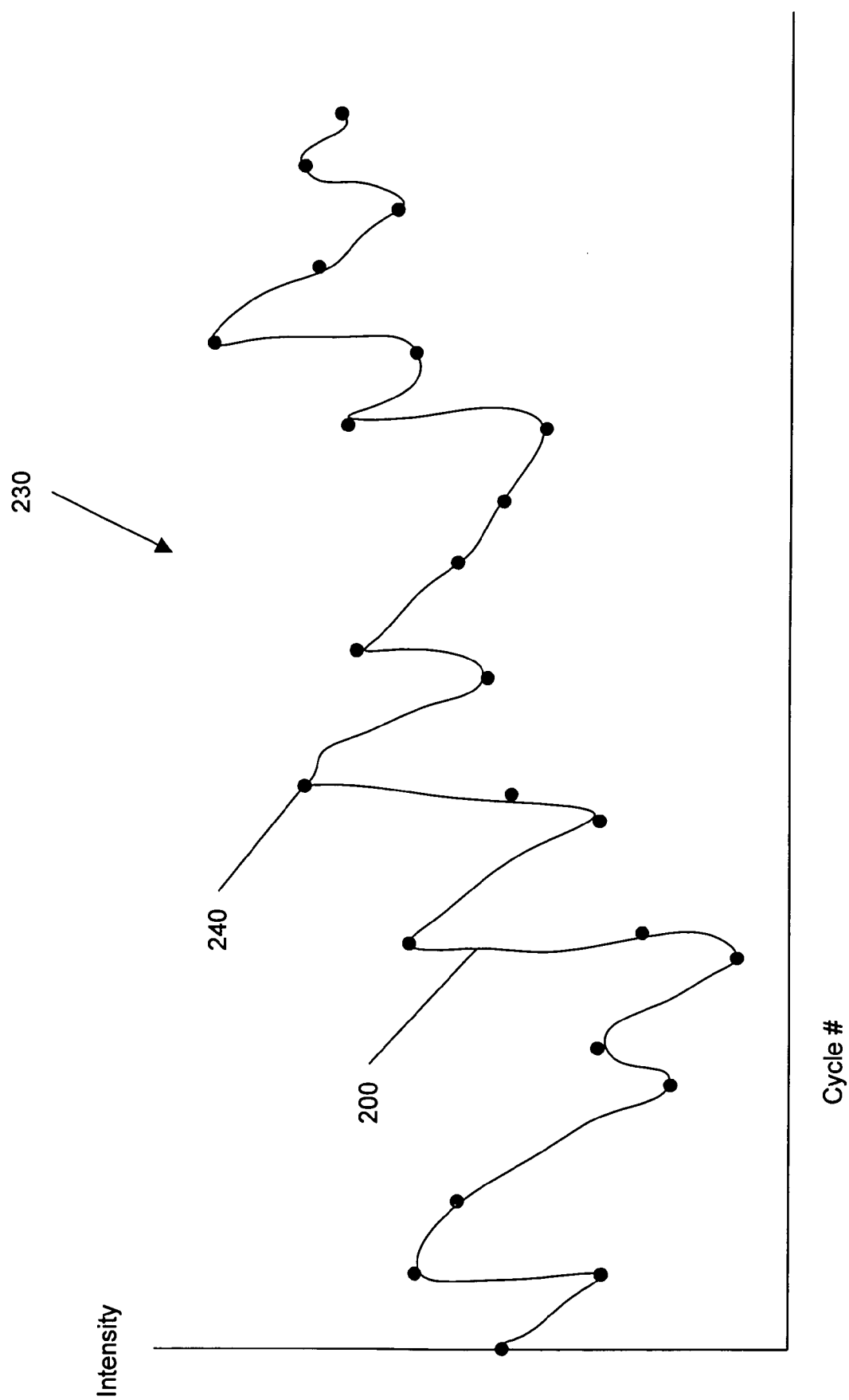
FIG. 2 illustrates a real-time PCR data set exhibiting noise and statistically linear behavior.

For example, FIG. 2 illustrates a linear region 230 of a real-time PCR curve 200 made from a data set with data points 240 that include a signal and noise. Note that even for devices that produce a constant signal, this data must be broken into data points for analysis. The noise causes the fluctuations in the data points. Overall, the data is generally moving upward (i.e. positive slope) in a linear fashion. However, as curve 200 is very non-linear from point to point, the generally linear behavior cannot be determined by directly analyzing curve 200 at any one point along the curve. A direct analysis of curve 200 would falsely determine that the data does not exhibit statistically linear behavior. Embodiments of the present invention effectively determine whether data exhibits statistically linear behavior.

Figure 3:
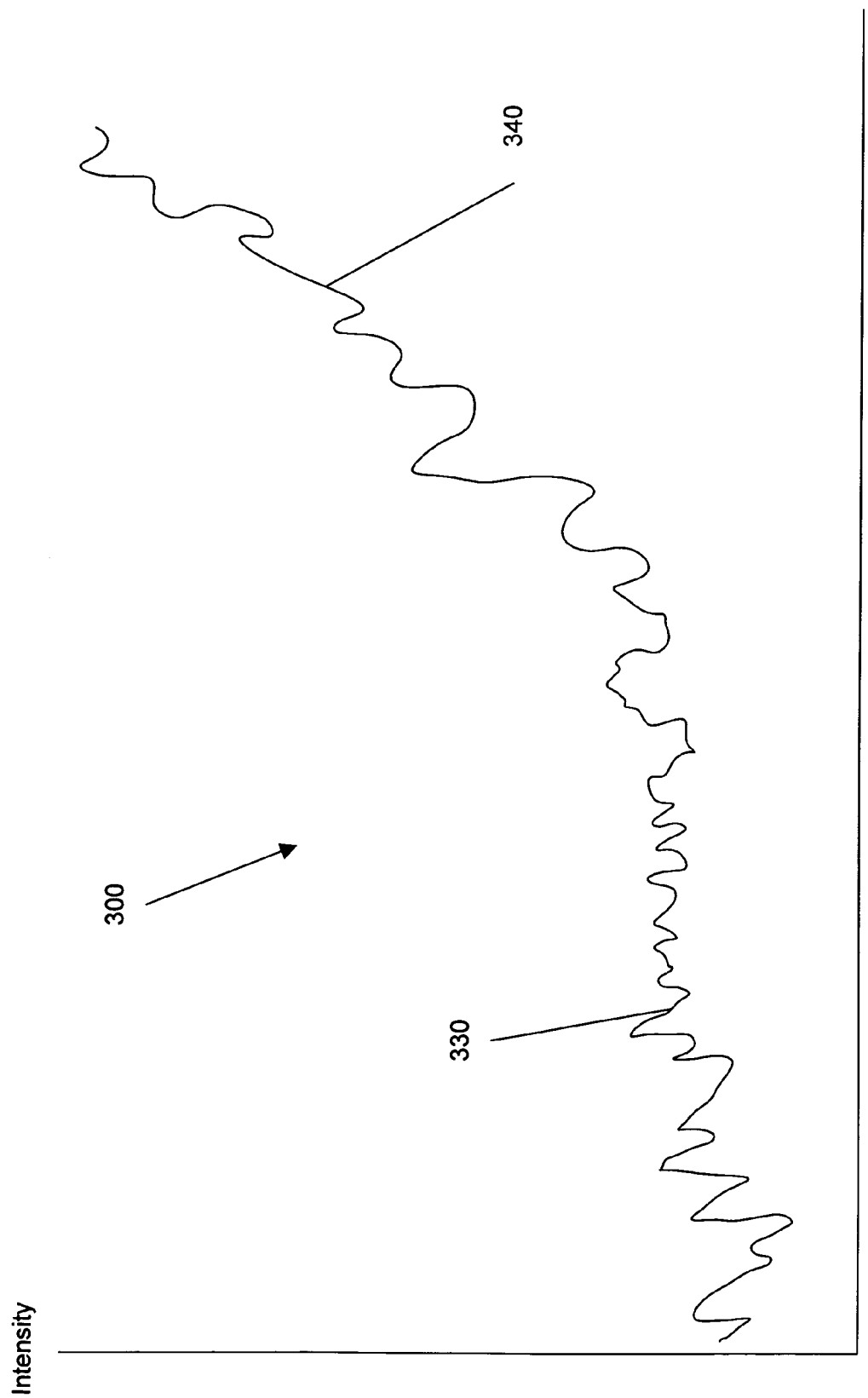
FIG. 3 illustrates a real-time PCR data set exhibiting noise and amplification.

Additionally, it is important to differentiate data curves having linear behavior and data curves having amplifying behavior. FIG. 3 illustrates a real-time PCR curve 300 that exhibits amplification. Initially, the data exhibits linear behavior in region 330 and in later cycles there is amplification in region 340. Embodiments of the present invention robustly and with consistent accuracy differentiate between PCR curve 200 having only linear behavior and PCR curves possibly having an amplifying region, such as PCR curve 300.

Figure 4:
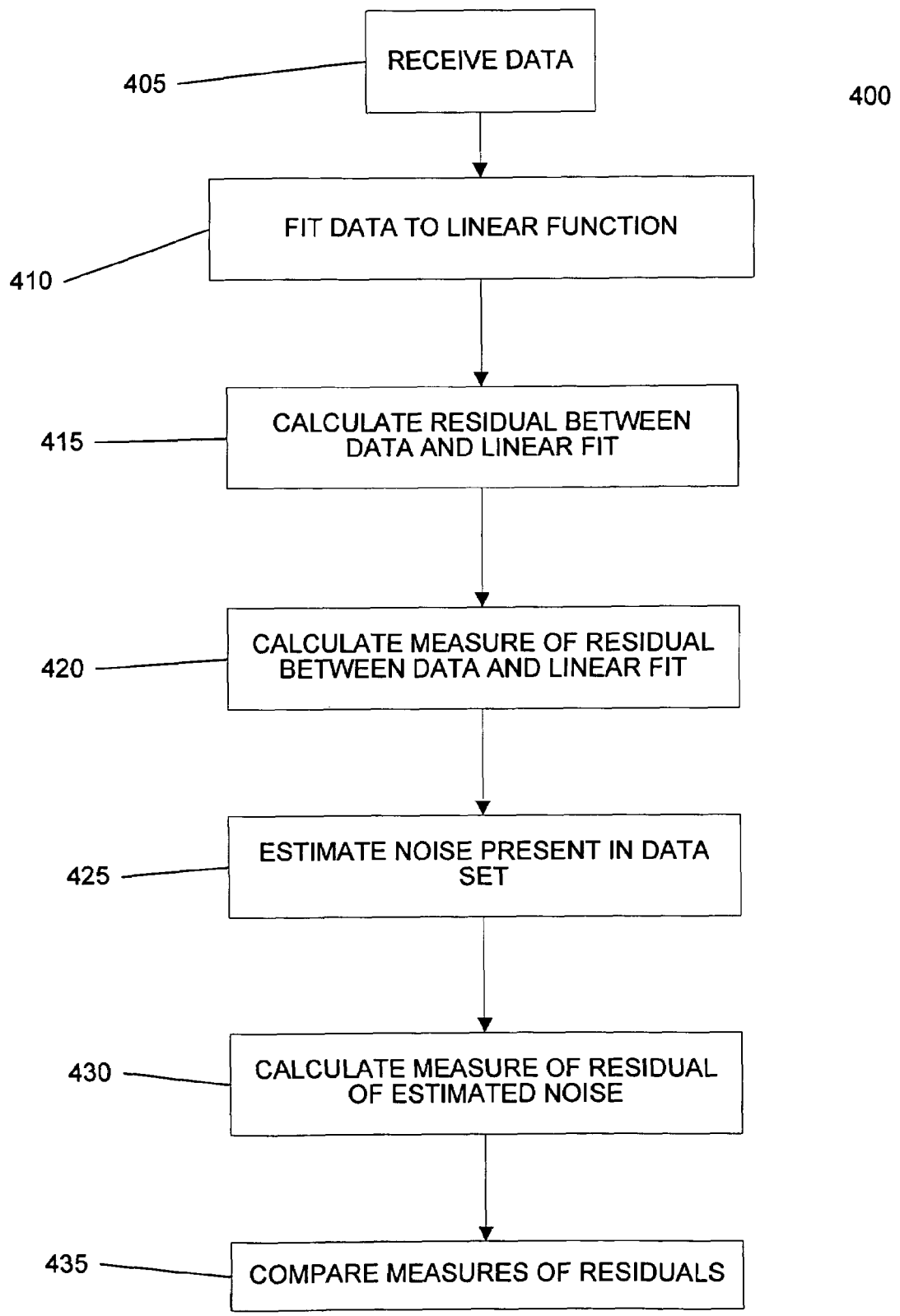
FIG. 4 illustrates a method of processing a data set to determine whether the data set exhibits statistically linear behavior according to an embodiment of the present invention.

FIG. 4 illustrates a method 400 of processing data to determine whether the data exhibits statistically linear behavior according to an embodiment of the present invention. The data set is composed of data points and represents a curve having a signal component and a noise component.

In step 405, the data set is first collected or received. The data set may be received through many mechanisms. For example, the data set may be acquired by a processor (executing instructions) resident in a PCR data acquiring device such as an iCycler iQ device or similar PCR analysis device. The data set may be provided to the processor in real time as the data is being collected, or it may be stored in a memory unit or buffer and provided to the processor after the experiment has been completed. Similarly, the data set may be provided to a separate system such as a desktop computer system via a network connection (e.g., LAN, VPN, intranet, Internet, etc.) or direct connection (e.g., USB or other direct wired or wireless connection) to the acquiring device, or provided on a portable medium such as a CD, DVD, floppy disk or the like to a stand-alone computer system. After the data set has been received or acquired, the data may be analyzed.

In step 410, a linear fit to the data set is calculated. Typically, a fit defines a merit function S that measures the agreement or difference between the data set and the fit, where small values of the merit function typically represent better parameters for the fit. For example, in a linear least squares fit, the merit function is the squares of the difference between the data values Y and the fit function $f(x_i)$, where for N data points $$S \equiv \sum_{i=1}^{N}(Y_i - f(x_i))^2.$$

Figure 5A:
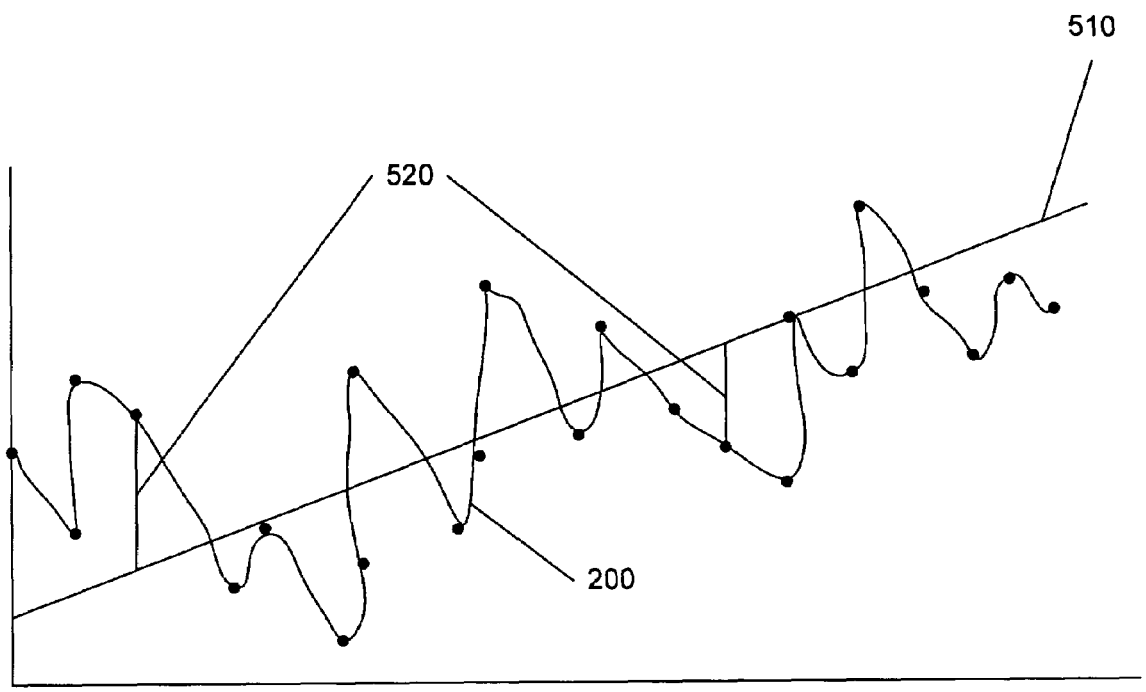
FIG. 5A illustrates a linear fit to a data set exhibiting statistically linear behavior.
Figure 5B:
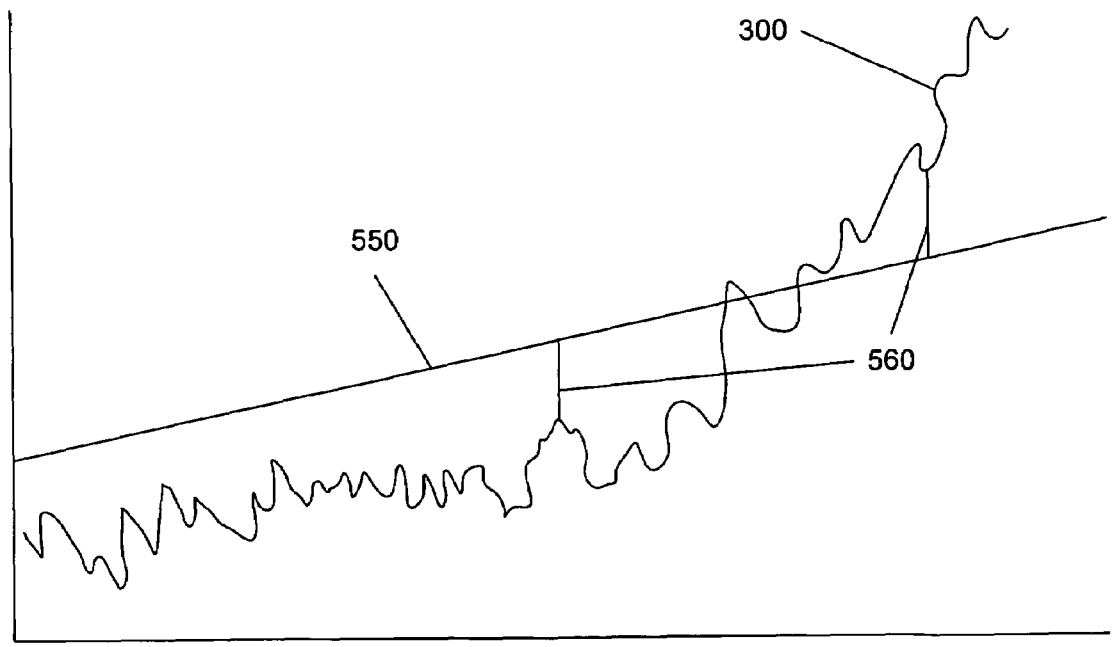
FIG. 5B illustrates a linear fit to a data set exhibiting amplifying behavior.

In a PCR process, Y is the data intensity and x is the cycle number. FIG. 5A shows a linear fit 510 of the PCR curve 200. FIG. 5B shows a linear fit 550 of PCR curve 300.

Merit functions may include different weight contributions or normalization factors to the merit function for different data points. Merit functions may also scale data point values or take a function of data points before a difference is taken. The difference may be taken between the data at one x value and $f(x)$ at a different x value. For example, a term in the merit function may represent the length of a line from data curve to the linear fit, such that the line is perpendicular to the linear fit. This occurs at a difference cycle number unless the linear fit has a slope of 0. One skilled in the art will recognize the many different merit functions that could be used.

In step 415, a residual R between the data and the linear fit is calculated. The residual R is a set of values corresponding to an error in the data points from the linear fit. For example, the residual may be the difference in the linear fit value and the actual data point for each cycle number, giving $R_i = Y_i - f(x_i)$, which is a standard form of the residual. In some embodiments, the residual is related to the values used to determine the merit function of the linear fit. In other embodiments, the residual is a different value. In FIG. 5A, errors 520 are used to calculate values of the residual R between curve 200 and linear fit 510. In FIG. 5B, errors 560 are used to calculate values of the residual R between curve 300 and linear fit 550.

In step 420, a measure $\sigma_1$ of the residual between the data and the linear fit is calculated. The measure is a single value made from the set of values that are the residual. In one embodiment, the residual is a standard deviation, giving $$\sigma_1 = \sqrt{\frac{1}{N} \sum_{i=1}^{N} R_i^2}.$$

Some embodiments may have a weighting value for each value of the residual, and other embodiments may subject each residual value or all residual values to additional or other functions. One skilled in the art will recognize the many different measures that could be used.

In step 425, an estimated noise component present in the data set is calculated. The data is presumed to consist of two components, a true signal and noise. Thus, the noise is the difference between the true signal and the actual data point. However, the true signal can never be directly measured as noise is always added or present when a signal is detected.

Figure 6A:
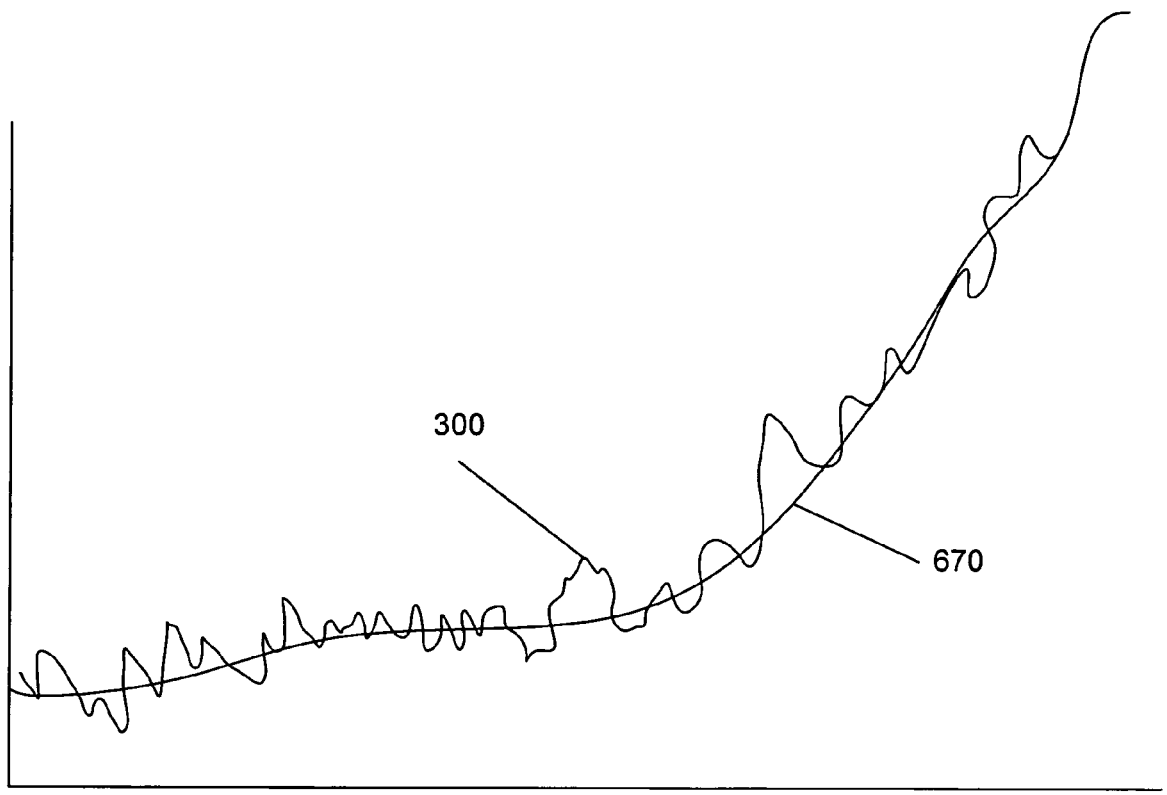
FIG. 6A illustrates a smoothed data set of real-time PCR data according to an embodiment of the present invention.

The true signal is estimated as a smoothed data set composed of smoothed data points. FIG. 6A shows a smoothed data set 670 of PCR curve 300. A value of a smoothed data point is based on a function G of a plurality of original data points that are local to that smoothed data point. The term local relates to how far away the x value of the data points are from the data point being calculated. For example, a point may be local to another point if they differ by a preset number (window) of cycles. A window of three and five cycles has proved adequate, but other windows may be used, such as 10 or 20 cycles or more. A variable window value may also be used, i.e. each smoothed data point may be calculated with a different window. Additionally, a window having fractions of a cycle may be used, for example where fractional data points are interpolated. A window may also not be symmetric around a data point, i.e. one point before and three points after that data point may be used. A point ceases to be local once the difference in the x value approaches the total scale used, i.e. total number of cycles.

In one embodiment, the function G is a moving average or low pass filter. For example, the function G may take an average of the original data points within a prescribed number of cycles, e.g. a centered mean. Thus in one embodiment, $$G(x_L) = \frac{1}{2K+1} \sum_{i=L-K}^{L+K} Y_i,$$

where L is the index of the smoothed data point being calculated and K is the window used.

Figure 6B:
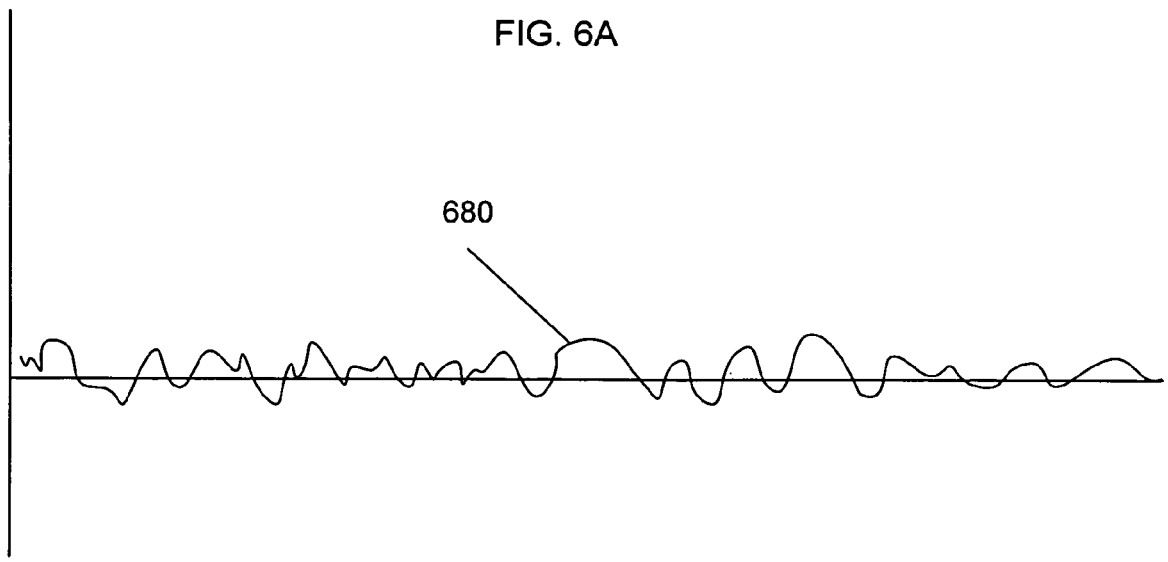
FIG. 6B illustrates an estimated noise of real-time PCR data according to an embodiment of the present invention.

Also, in step 425, a residual between the smoothed data and the original data is calculated. This residual is defined to be the estimated noise. The residual between the smoothed data and the original data may be defined in the same manner as the residual between the original data and the linear fit, or the residuals may be defined in a different manner. FIG. 6B shows an estimated noise component 680 associated with PCR curve 300 and smoothed data set 670. A superposition of noise component 680 on signal 670 gives the data curve 300.

In step 430, a measure $\sigma_2$ of the residual between the smoothed data and the original data is calculated. The $\sigma_2$ value is used as a measure of the amplitude of intrinsic noise. In one embodiment $\sigma_2$ is a standard deviation. The measures $\sigma_1$ and $\sigma_2$ may be defined in a similar or different fashion.

In step 435, the first measure $\sigma_1$ is compared to the second measure $\sigma_2$ to determine whether the data set exhibits linear behavior. In one embodiment, a ratio of $\sigma_1$ and $\sigma_2$ is taken. If the ratio is smaller or greater than a pre-defined value then the data is determined to exhibit linear behavior. For example, if $\sigma_1/\sigma_2$ is less than a value of order one, e.g. 1.5, the data is determined to be linear. Equivalently, the expression $\sigma_1 < c_0 * \sigma_2$ may be used. This expression states that the measure of the difference between the data and a linear fit must be less than a constant times the measure of the estimated noise present in the data. In some embodiments, the value of $c_0$ may vary.

The constant $c_0$ is related to the fact that the definition of noise, as well as other values, is not unique. The value for $c_0$ may be obtained by examining large numbers of data sets to obtain a reasonable value for this number. Studies have indicated a value of 1.5 works well for the constant ($c_0$), when a standard deviation of a standard residual is used. When other residuals and measures of the residual are used, other values might be more suitable. In general, a value of $c_0$ on the order of 1 should work well.

Once the data has been identified as statistically flat (linear), e.g. not curving downward or upward or otherwise displaying amplification, the data may be discarded from further analysis.

In certain aspects, code and instructions for controlling a processor to implement the data processing techniques of the present invention are stored on a computer-readable or information storage medium such as a RAM or ROM unit, hard drive, CD, DVD or other portable medium.

Figure 7:
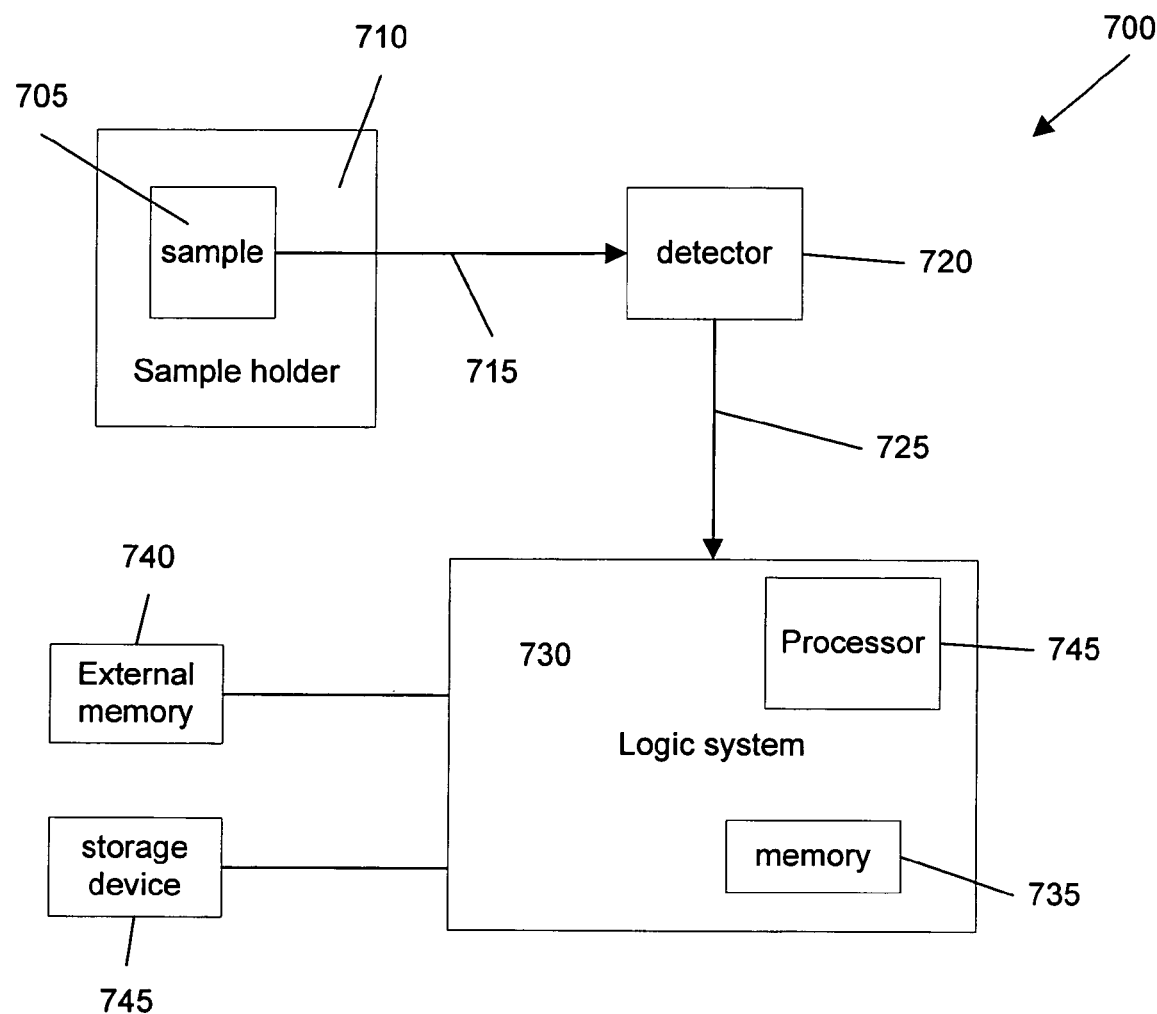
FIG. 7 illustrates a system that processes real-time PCR data according to an embodiment of the present invention.

FIG. 7 illustrates a system 700 according to one embodiment of the present invention. The system as shown includes a sample 705, such as bacteria or DNA, within a sample holder 710. A physical characteristic 715, such as a fluorescence intensity value, from the sample is detected by detector 720. A signal 725, including a noise component, is sent from detector 720 to logic system 730. The data from signal 725 may be stored in a local memory 735 or an external memory 740 or storage device 745. In one embodiment, an analog to digital converter converts an analog signal to digital form.

Logic system 730 may be, or may include, a computer system, ASIC, microprocessor, etc. It may also include or be coupled with a display (e.g., monitor, LED display, etc.) and a user input device (e.g., mouse, keyboard, buttons, etc.). Logic system 730 and the other components may be part of a stand alone or network connected computer system, or they may be directly attached to or incorporated in a thermal cycler device. Logic system 730 may also include optimization software that executes in a processor 750.

According to one embodiment, logic system 730 includes instructions for processing data and identifying statistically flat data. The instructions are preferably downloaded and stored in a memory modules 735, 740, or 745 (e.g., hard drive or other memory such as a local or attached RAM or ROM), although the instructions can be provided on any software storage medium such as a floppy disk, CD, DVD, etc. It should be understood that computer code for implementing aspects of the present invention can be implemented in a variety of coding languages such as C, C++, Java, Visual Basic, and others, or any scripting language, such as VBScript, JavaScript, Perl or markup languages such as XML. In addition, a variety of languages and protocols can be used in the external and internal storage and transmission of data and commands according to aspects of the present invention.

It will be appreciated that the process described herein is illustrative and that variations and modifications are possible. Steps described as sequential may be executed in parallel, order of steps may be varied, and steps may be modified or combined.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of processing a data set to determine whether the data set exhibits statistically linear behavior, the method comprising:
   receiving an original set of data points having a signal component and a noise component, each data point representing a physical quantity of a substance during an amplification process;
   fitting the original data set to a linear function;
   calculating a residual between the original data set and the fitted linear function;
   calculating a first measure of the residual between the original data set and the fitted linear function;
   estimating the noise component present in the original data set, by:
      i) calculating a smoothed data set by determining a set of smoothed data points, wherein a value of a smoothed data point is based on values of a plurality of original data points that are local to that smoothed data point; and
      ii) calculating a residual between the smoothed data set and the original data set;
   calculating a second measure of the residual between the smoothed data set and the original data set; and
   comparing the first measure to the second measure to determine whether the original data set exhibits statistically linear behavior, wherein the method is implemented using a processor.

2. The method of claim 1, wherein fining the original data set includes using a least squares fit.

3. The method of claim 1, wherein calculating the smoothed data set comprises using a low pass filter.

4. The method of claim 1, wherein a value of a smoothed data point is an average of the original data points within a window around the smoothed data point.

5. The method of claim 4, wherein the window is five units.

6. The method of claim 1, wherein the first measure and the second measure are each a standard deviation.

7. The method of claim 1, wherein comparing includes calculating a ratio of the first and second measure to determine if the ratio is smaller or greater than a pre-defined value.

8. The method of claim 7, wherein the pre-defined value is of order 1.

9. The method of claim 1, wherein the data represents a PCR amplification curve.

10. The method of claim 1, wherein the processor is integrated in one of a stand alone computer system, a networked computer system or a real-time PCR machine.

11. A tangible information storage medium storing a plurality of instructions adapted to direct an information processing device to perform an operation of processing data to determine whether the data exhibits linear behavior, the operation comprising the steps of:
    receiving an original set of data points having a signal component and a noise component, each data point representing a physical quantity of a substance during an amplification process;
    fitting the original data set to a linear function;
    calculating a residual between the original data set and the fitted linear function;
    calculating a first measure of the residual between the original data set and the fitted linear function;
    estimating the noise component present in the original data set, by:
       i) calculating a smoothed data set by determining a set of smoothed data points, wherein a value of a smoothed data point is based on values of a plurality of original data points that are local to that smoothed data point; and
       ii) calculating a residual between the smoothed data set and the original data set;
    calculating a second measure of the residual between the smoothed data set and the original data set; and
    comparing the first measure to the second measure to determine whether the original data set exhibits statistically linear behavior.

12. The information storage medium of claim 11, wherein fitting the original data set includes using a least squares fit.

13. The information storage medium of claim 11, wherein calculating the smoothed data set comprises using a low pass filter.

14. The information storage medium of claim 11, wherein a value of a smoothed data point is an average of the original data points within a window around the smoothed data point.

15. The information storage medium of claim 11, wherein the first measure and the second measure are each a standard deviation.

16. The information storage medium of claim 11, wherein the comparing includes calculating a ratio of the first and second measure to determine if the ratio is smaller or greater than a pre-defined value.

17. The information storage medium of claim 11, wherein the data represents a PCR amplification curve.

18. A PCR detection system comprising:
    a detector for producing an original set of data points having a signal component and a noise component, wherein the data represents a PCR amplification curve; and
    logic for processing data to determine whether the data exhibits linear behavior, by:
       fitting the original data set to a linear function;
       calculating a residual between the original data set and the fitted linear function;
       calculating a first measure of the residual between the original data set and the fitted linear function;
       estimating the noise component present in the original data set, by:
          i) calculating a smoothed data set by determining a set of smoothed data points, wherein a value of a smoothed data point is based on values of a plurality of original data points that are local to that smoothed data point; and ii) calculating a residual between the smoothed data set and the original data set;

calculating a second measure of the residual between the smoothed data set and the original data set; and comparing the first measure to the second measure to determine whether the original data set exhibits statistically linear behavior.

19. The PCR detection system of claim 18, wherein fitting the original data set includes using a least squares fit.

20. The PCR detection system of claim 18, wherein calculating the smoothed data set comprises using a low pass filter.

21. The PCR detection system of claim 18, wherein a value of a smoothed data point is an average of the original data points within a window around the smoothed data point.

22. The PCR detection system of claim 18, wherein the first measure and the second measure are each a standard deviation.

23. The PCR detection system of claim 18, wherein the comparing includes calculating a ratio of the first and second measure to determine if the ratio is smaller or greater than a pre-defined value.

* * * * *

UNITED STATES PATENT AND TRADEMARK OFFICE
CERTIFICATE OF CORRECTION

PATENT NO.       : 7,647,187 B2                                    Page 1 of 1
APPLICATION NO.  : 11/432856
DATED            : January 12, 2010
INVENTOR(S)      : Jeffrey Lerner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,187 B2 | |
| APPLICATION NO. | : 11/432856 | |
| DATED | : January 12, 2010 | |
| INVENTOR(S) | : Jeffrey Lerner | |

It is certified that error appears in the above-identified patent and that said Letters Patent is hereby corrected as shown below:

In claim 2, column 7, line 53, please replace "fining" with --fitting--.

Signed and Sealed this
Twenty-eighth Day of August, 2012

David J. Kappos
*Director of the United States Patent and Trademark Office*